(12) United States Patent
Hoyle et al.

(10) Patent No.: US 11,125,049 B2
(45) Date of Patent: Sep. 21, 2021

(54) SUPERHARD MATERIAL ENHANCED CHOKE CAGE

(71) Applicant: Cameron Technologies Limited, The Hague (NL)

(72) Inventors: David C. Hoyle, Salt Lake City, UT (US); Neil Cannon, Woodland Hills, UT (US); David S. Clark, Eagle Mountain, UT (US)

( * ) Notice: Subject to any disclaimer, the term of this patent is extended or adjusted under 35 U.S.C. 154(b) by 0 days.

(21) Appl. No.: 16/480,061

(22) PCT Filed: Jan. 22, 2018

(86) PCT No.: PCT/US2018/014612
§ 371 (c)(1),
(2) Date: Jul. 23, 2019

(87) PCT Pub. No.: WO2018/136846
PCT Pub. Date: Jul. 26, 2018

(65) Prior Publication Data
US 2019/0390531 A1    Dec. 26, 2019

Related U.S. Application Data

(60) Provisional application No. 62/449,311, filed on Jan. 23, 2017.

(51) Int. Cl.
*E21B 34/02* (2006.01)
*F16K 3/24* (2006.01)
(Continued)

(52) U.S. Cl.
CPC .............. *E21B 34/02* (2013.01); *F16K 3/24* (2013.01); *F16K 3/314* (2013.01); *F16K 25/04* (2013.01); *F16K 39/022* (2013.01); *F16K 47/08* (2013.01)

(58) Field of Classification Search
CPC . F16K 47/08; F16K 3/24; F16K 25/04; F16K 39/022; F16K 3/314; E21B 34/02
See application file for complete search history.

(56) References Cited

U.S. PATENT DOCUMENTS

| 137,612 A | 4/1873 | Krumscheid |
| 3,570,806 A | 3/1971 | Stuman et al. |

(Continued)

FOREIGN PATENT DOCUMENTS

| CN | 201896960 U | 7/2011 |
| EP | 0520567 A1 | 12/1992 |

(Continued)

OTHER PUBLICATIONS

International Search Report and Written Opinion for the cross referenced International patent application PCT/US2017/034547 dated Aug. 4, 2017.

(Continued)

*Primary Examiner* — James G Sayre

(57) ABSTRACT

A choke valve for regulating a flow rate, a pressure or other parameters of a fluid flow may comprise a choke cage comprising a passage therethrough and a choke plug slidable within the passage. At least one conduit may pass through a wall of the choke cage and into the passage such that as the choke plug slides it may at least partially cover the conduit. A ring comprising a sintered superhard material may be secured within the conduit enhancing durability and wear resistance of the choke cage. A method for manufacturing such a choke cage may comprise subjecting grains of superhard material to high-pressure, high-temperature conditions sufficient to sinter at least some of the grains together, hollowing out the sintered superhard material to form a ring, and securing the ring within a conduit.

18 Claims, 8 Drawing Sheets

(51) Int. Cl.
*F16K 3/314* (2006.01)
*F16K 25/04* (2006.01)
*F16K 39/02* (2006.01)
*F16K 47/08* (2006.01)

(56) References Cited

U.S. PATENT DOCUMENTS

| | | | |
|---|---|---|---|
| 4,190,073 A | | 2/1980 | Claycomb |
| 4,240,609 A | * | 12/1980 | Hahn .................. F16K 39/022 251/282 |
| 4,257,442 A | | 3/1981 | Claycomb |
| 4,355,784 A | | 10/1982 | Cain |
| 4,503,878 A | | 3/1985 | Taylor |
| 4,732,364 A | * | 3/1988 | Seger .................. E21B 34/02 251/122 |
| 5,246,035 A | * | 9/1993 | Skyllingstad .......... E21B 34/02 137/625.31 |
| 5,368,273 A | | 11/1994 | Dante |
| 7,025,140 B2 | | 4/2006 | McGee |
| 7,137,612 B2 | | 11/2006 | Baca |
| 7,363,937 B2 | | 4/2008 | Suter et al. |
| 10,125,875 B2 | | 11/2018 | Evans et al. |
| 2001/0013587 A1 | | 8/2001 | Robinson et al. |
| 2005/0072464 A1 | | 4/2005 | Schmidt et al. |
| 2011/0042592 A1 | * | 2/2011 | Elliott ................... G05D 7/012 251/120 |
| 2011/0094607 A1 | | 4/2011 | Elliott |
| 2011/0226980 A1 | | 9/2011 | Richardson et al. |
| 2012/0103595 A1 | * | 5/2012 | Hall ..................... E21B 21/10 166/194 |
| 2012/0238188 A1 | | 9/2012 | Miller |
| 2016/0123099 A1 | | 5/2016 | Kapavarapu et al. |
| 2017/0102084 A1 | * | 4/2017 | Bohaychuk ............ E21B 34/02 |

FOREIGN PATENT DOCUMENTS

| | | |
|---|---|---|
| JP | 2010-005495 A | 1/2010 |
| JP | 2010-121735 A | 6/2010 |
| WO | 2015/115907 A1 | 8/2015 |

OTHER PUBLICATIONS

International Search Report and Written Opinion for the International patent application PCT/US2018/014612 dated May 4, 2018.
International Preliminary Report on Patentability for the International patent application PCT/US2017/034547 dated Dec. 13, 2018.
International Preliminary Report on Patentability for the International patent application PCT/US2018/014612 dated Aug. 1, 2019.

* cited by examiner

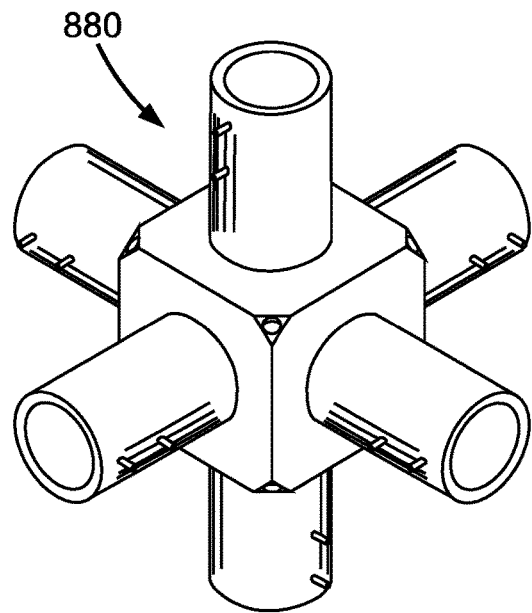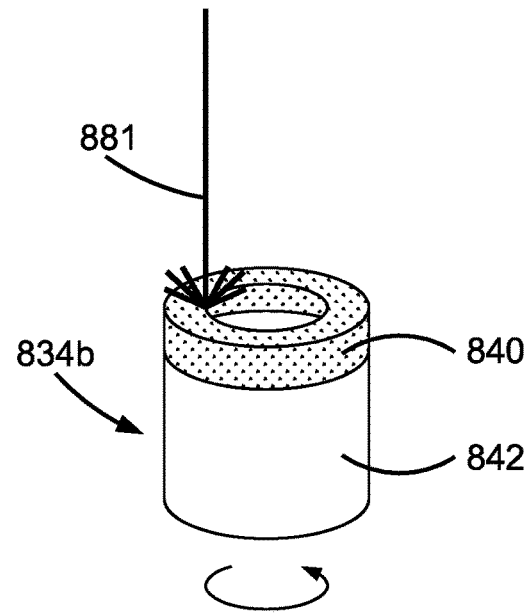
Fig. 8a
Fig. 8b
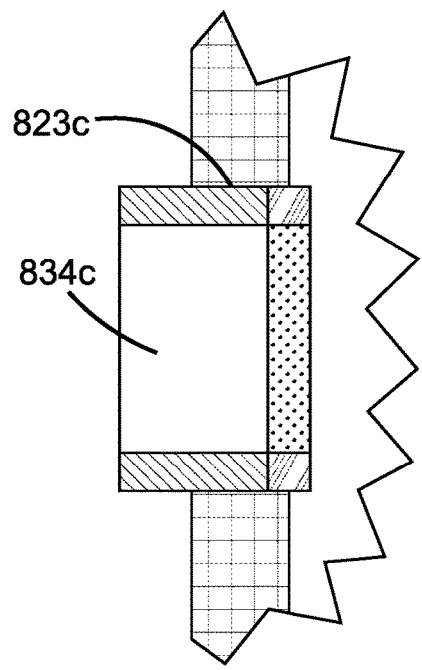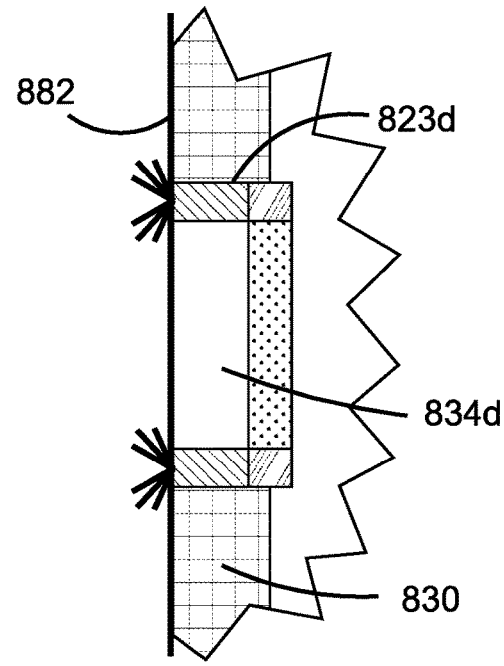
Fig. 8c
Fig. 8d

SUPERHARD MATERIAL ENHANCED CHOKE CAGE

BACKGROUND

A choke valve is a type of fluid-handling device commonly used to regulate a flow rate, a pressure and other parameters of a fluid flow. For example, in petroleum and natural gas production, choke valves may be used to control the flow of oil or gas being extracted from a well. A typical choke valve may include a choke cage comprising a passage therethrough. A series of conduits may pass through a wall of the choke cage and into the passage. A choke plug may slide within the passage to at least partially cover the conduits thus adjusting a flow rate of fluid through each conduit.

The relatively high pressure experienced by such choke valves may lead to wear, erosion and other degradation. Accordingly, choke valves designed to enhance durability and wear resistance may be desirable.

BRIEF DESCRIPTION

A choke valve, capable of regulating a flow rate, a pressure or other parameters of a fluid flow, is disclosed herein comprising a choke cage and a choke plug slidable within a passage through the choke cage. At least one conduit may pass through a wall of the choke cage and into the passage. As the choke plug slides, it may at least partially cover the conduit. A ring comprising a sintered superhard material may be secured within the conduit enhancing durability and wear resistance of the choke cage.

In some embodiments of such a choke cage, the ring may further comprise a substrate attached to the sintered superhard material. The substrate may take the form of a circular band placed adjacent one or more circular bands of the sintered superhard material. The ring may be secured within the conduit such that one or more mouths of the conduit contact only the sintered superhard material.

The ring may comprise any of a variety of internal shapes that may aid in its purpose. For example, the ring may comprise a cylindrical, frustoconical or frustoparaboloidal internal shape or a chamfer or round transitioning from an inner surface of the ring to an end thereof.

The ring may be secured within the conduit by any of a variety of mechanisms. For example, the ring may be secured within the conduit by braze, adhesive, polyetheretherketone or friction. The ring may be secured within the conduit by a ferrule or the conduit may comprise a translation-limiting shape, such as a shoulder or taper, that may hold the ring in place. The ring may also be secured within the conduit by a sleeve shrunk fit around an exterior of the choke cage.

A method for manufacturing such a choke cage may comprise subjecting grains of superhard material to high-pressure, high-temperature conditions sufficient to sinter at least some of the grains together. The sintered superhard material may be hollowed out to form a ring and then the ring may be secured within a conduit of a choke cage. The ring may then be machined flush with the choke cage.

DRAWINGS

Figure 4A:
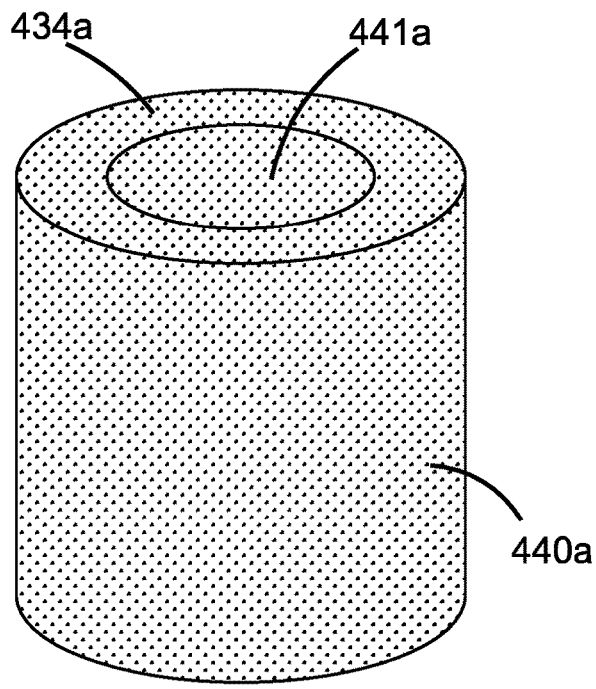
Figure 4B:
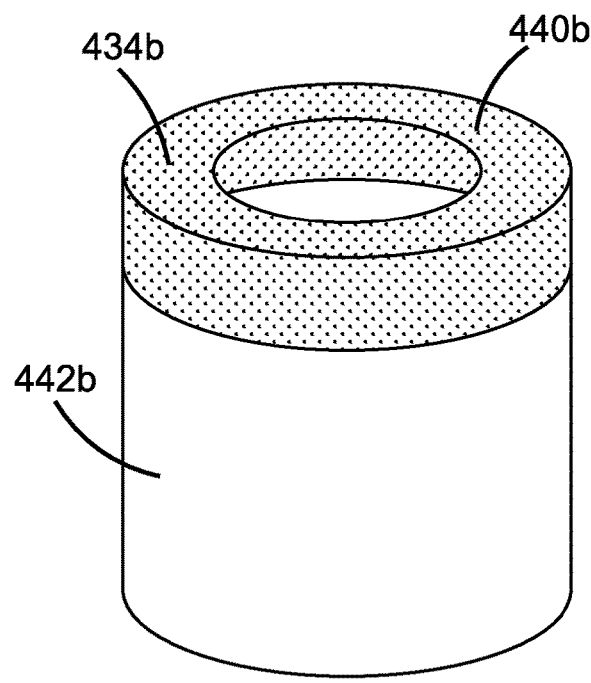
Figure 4C:
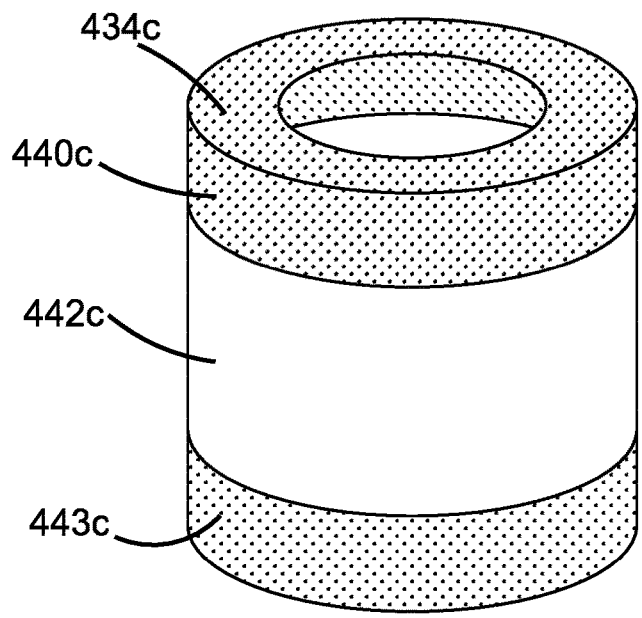
Figure 5A:
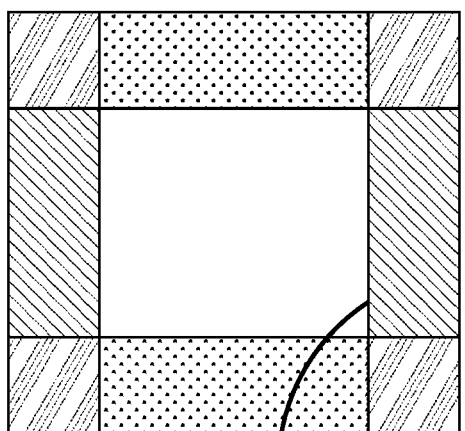
Figure 5B:
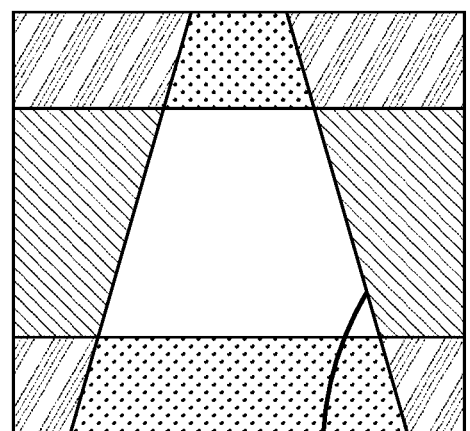
Figure 5C:
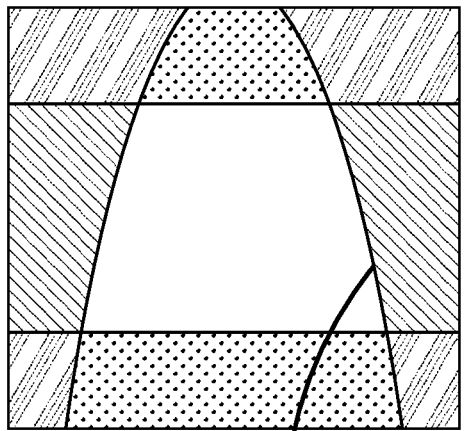
Figure 5D:
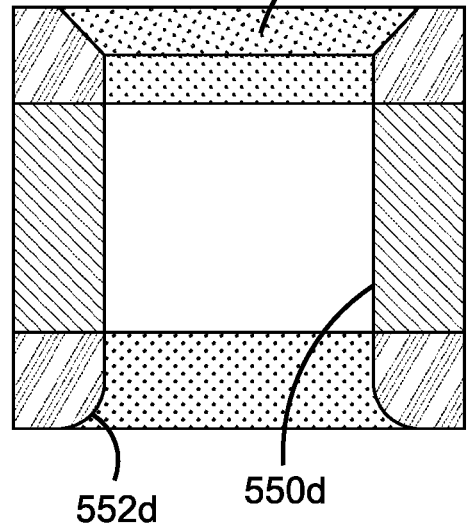

FIGS. 4a-c are perspective views of various embodiments of rings comprising sintered superhard material.

FIGS. 5a-d are longitude-sectional views of various embodiments of rings comprising a variety of internal shapes.

Figure 6:
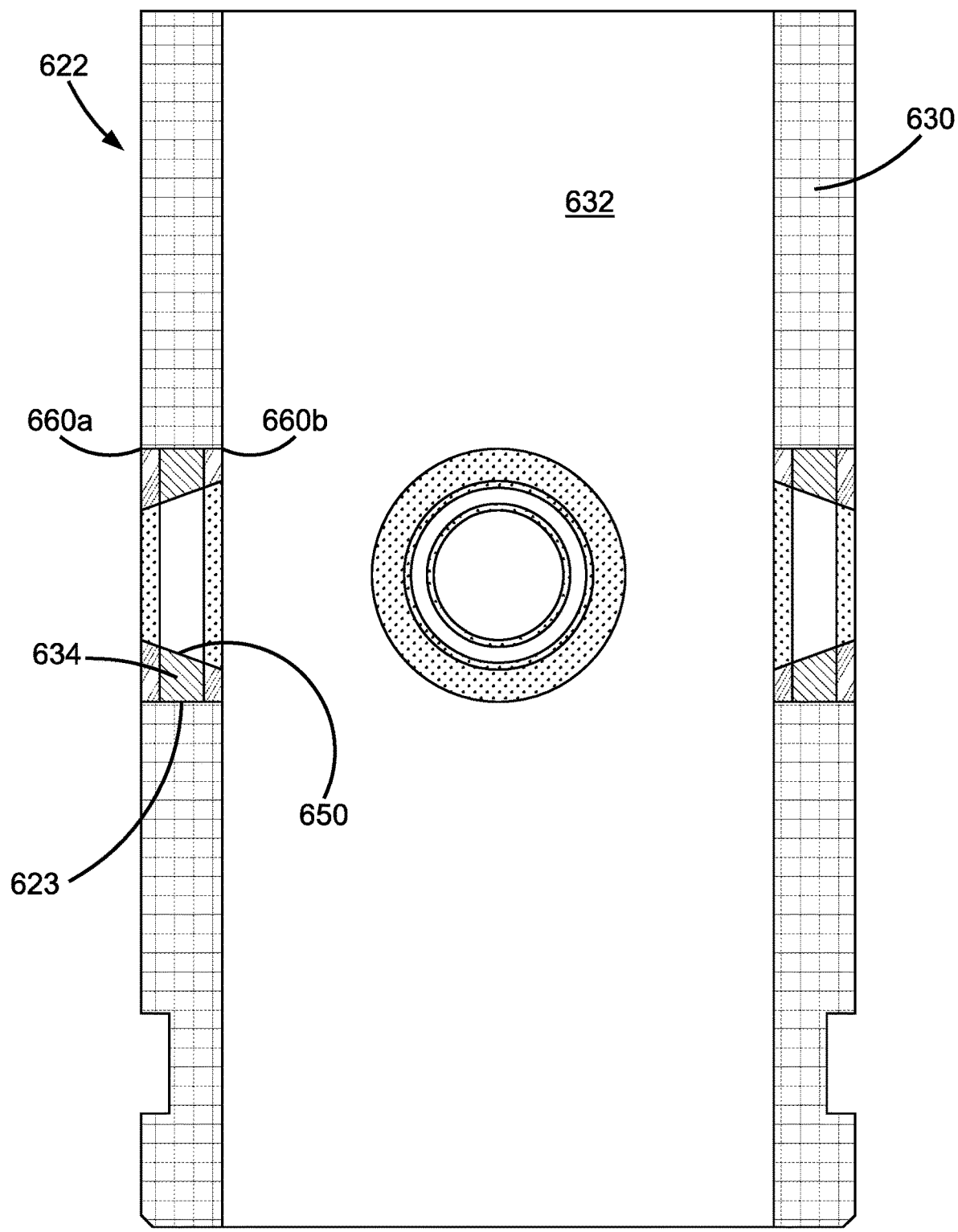
Figure 7A:
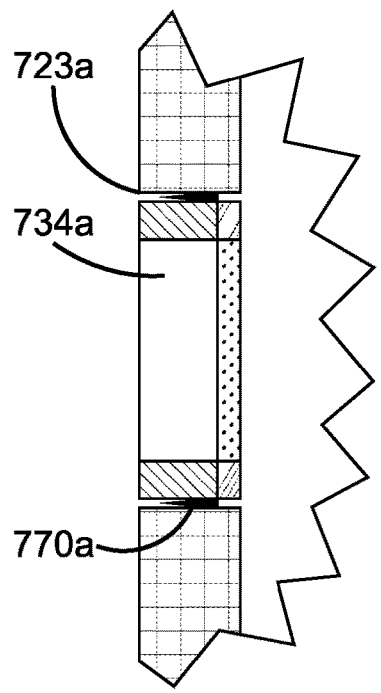
Figure 7B:
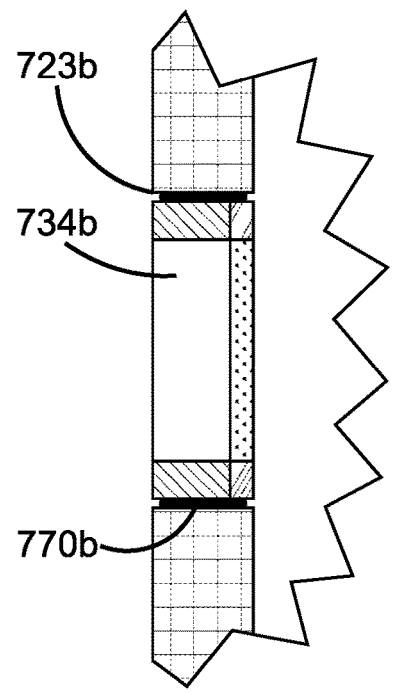
Figure 7C:
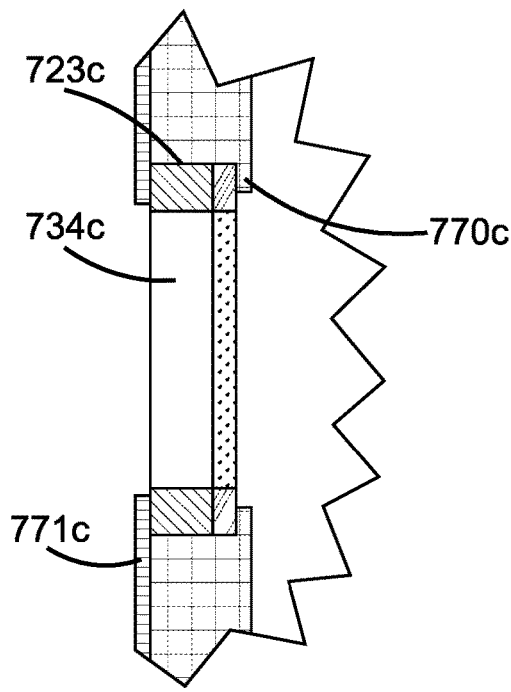
Figure 7D:
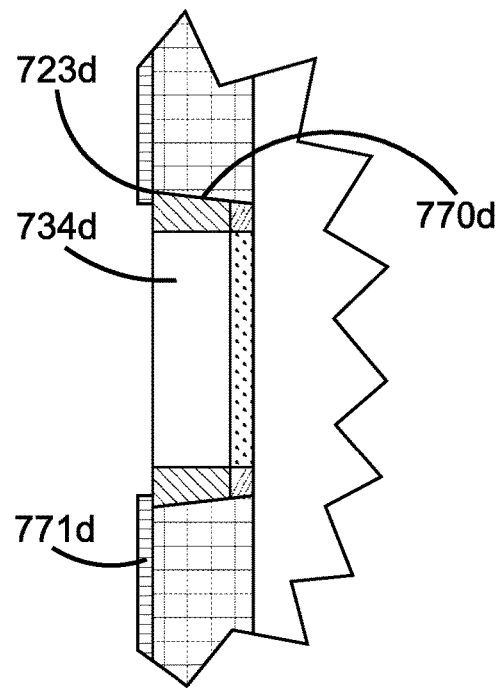

FIG. 6 is a longitude-sectional view of an embodiment of a choke cage comprising a ring secured within a conduit passing through a body thereof.

FIGS. 7a-d are cutaway sectional views of various embodiments of rings secured within conduits.

FIGS. 8a-d are representative of various steps in one embodiment of a method of manufacturing a choke cage.

DETAILED DESCRIPTION

Figure 1:
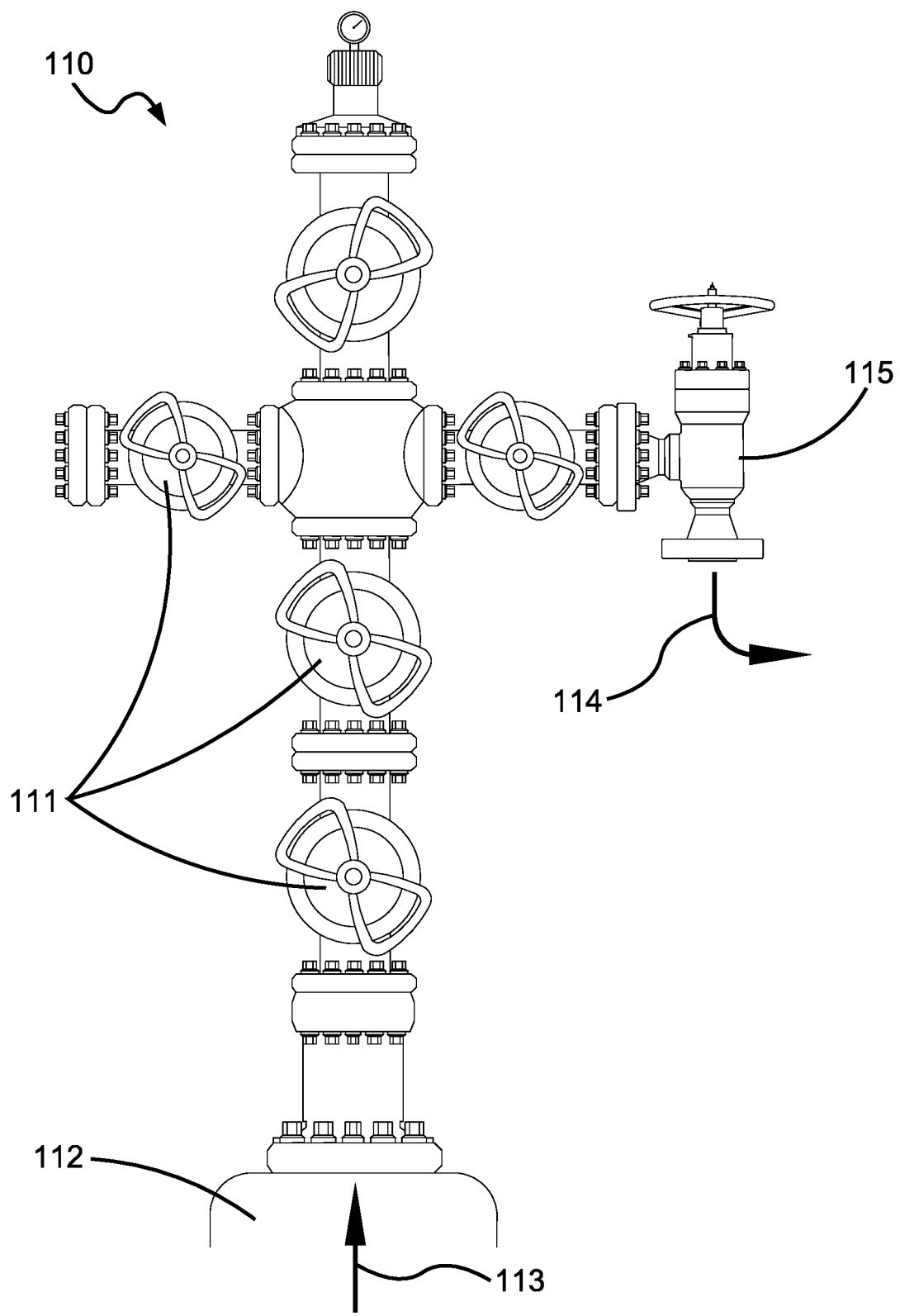
FIG. 1 is an orthogonal view of an embodiment of an assembly of valves, spools, and fittings, known as a "Christmas tree," that may be used in petroleum and natural gas production to control a flow of oil or gas out of a well and to a processing facility.

FIG. 1 shows an embodiment of what is known in the art of petroleum and natural gas production as a "Christmas tree" 110. The Christmas tree 110 comprises an assembly of valves, spools, and fittings 111 that may be installed on top of a wellhead 112 to control a flow of oil or gas out of a well, shown by arrow 113, and to a processing facility, shown by arrow 114. One of the elements forming this Christmas tree 110 is a choke valve 115 that may restrict flow rate or pressure leading to the processing facility.

Figure 2:
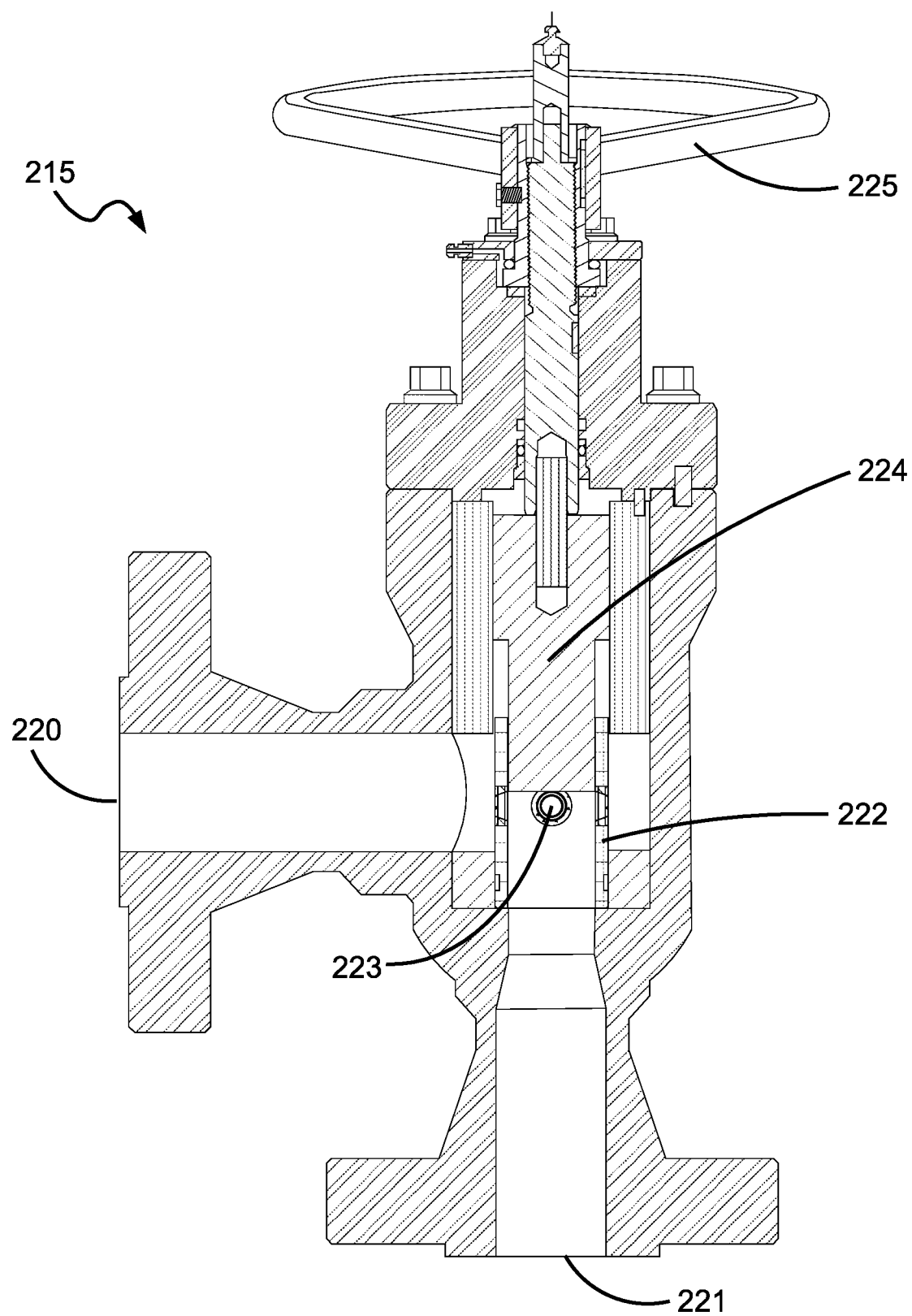
FIG. 2 is a sectional view of an embodiment of a choke valve that could form part of a Christmas tree of the type shown in FIG. 1.

FIG. 2 shows an embodiment of a choke valve 215 comprising a fluid inlet 220 and a fluid outlet 221. Fluid entering the fluid inlet 220 may surround a choke cage 222 comprising a plurality of conduits 223 passing therethrough. The conduits 223 may be opened or sealed by a plug 224 to allow the fluid to pass through. Once inside the choke cage 222 the fluid may exit through the fluid outlet 221. In the present embodiment, the plug 224 may translate coaxially within the choke cage 222 to open or seal the conduits 223. However, other embodiments may utilize a rotary plug or various alternative designs. Also in this embodiment, the plug 224 may be translated by manually rotating a lever 225. However, other embodiments may utilize powered rotation or various alternative designs.

Figure 3:
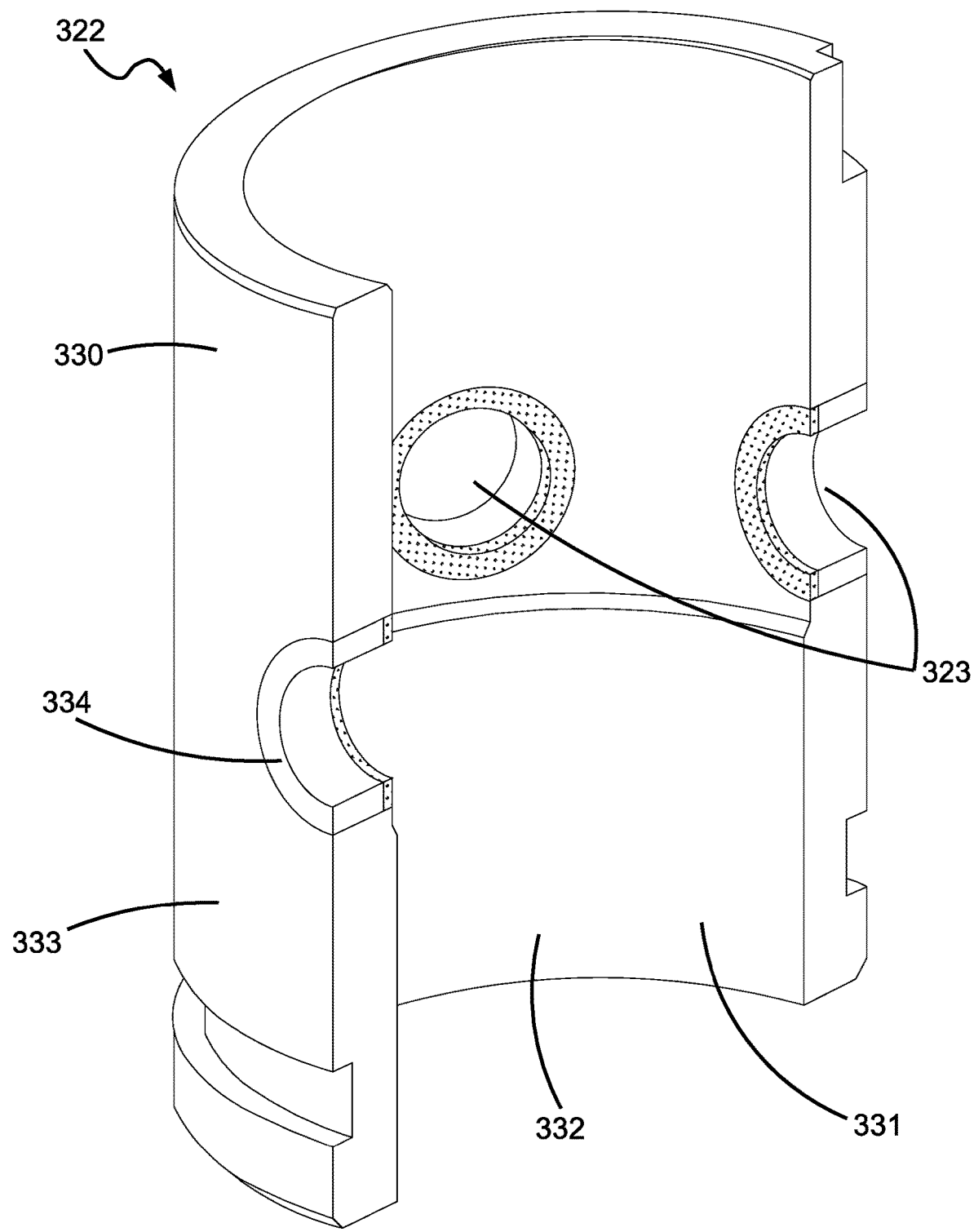
FIG. 3 is a half-cutaway view of an embodiment of a choke cage that could form part of a choke valve of the type shown in FIG. 2.

FIG. 3 shows an embodiment of a choke cage 322 comprising a generally cylindrical body 330 with a generally cylindrical passage 331 extending therethrough. This passage 331 may form an interior surface 332 of the body 330 that may run generally parallel to an exterior surface 333 of the body. A plurality of conduits 323 may each pass from the exterior surface 333 through to the interior surface 332. An individual ring 334, comprising sintered superhard material such as polycrystalline diamond, may be secured within each of the conduits 323.

FIGS. 4a-c show various embodiments of rings 434a-c comprising sintered superhard material. Ring 434a, shown in FIG. 4a, is formed completely of sintered superhard material 440a and comprises a generally cylindrical shape with a hole 441a extending axially therethrough. While a ring formed completely of sintered superhard material may have some advantages, such as superior wear resistance, it may also be expensive and difficult to manufacture. Ring 434b, shown in FIG. 4b, comprises a substrate 442b attached to sintered superhard material 440b. As shown, the sintered superhard material 440*b* may form a first circular band on one end of the ring 434*b* and the substrate 442*b* may form a second circular band adjacent the first circular band. Ring 434*c*, shown in FIG. 4*c*, comprises a first circular band 440*c* of sintered superhard material adjacent a second circular band 442*c* substrate and opposite a third circular band 443*c* also of sintered superhard material. It is believed that embodiments of rings comprising sintered superhard material on ends thereof may reduce erosion at critical areas while being more economical.

FIGS. 5*a*-*d* show various embodiments of rings 534*a*-*d* comprising a variety of internal shapes. For example, ring 534*a*, shown in FIG. 5*a*, comprises a cylindrical internal shape 550*a* forming an internal surface thereof parallel with an external surface thereof. Ring 534*b*, shown in FIG. 5*b*, comprises a frustoconical internal shape 550*b* and ring 534*c*, shown in FIG. 5*c*, comprises a frustoparaboloidal internal shape 550*c* that may be positioned within a conduit so as to be wider toward one side compared to the other. Further, ring 534*d*, shown in FIG. 5*d*, comprises a chamfer 551*d* transitioning from an inner surface 550*d* of the ring 534*d* to an end thereof and a round 552*d* transitioning from the inner surface 550*d* to an opposite end thereof. It is believed that such chamfers and rounds may extend the useful life of such rings.

FIG. 6 shows an embodiment of a choke cage 622 comprising a ring 634 secured by a friction fit within a conduit 623 passing through a body 630 of the choke cage 622. As can be seen, the ring 634 is oriented within the conduit 623 such that an internal shape 650 of the ring 634 widens toward an interior surface 632 of the body 630. As can also be seen in this embodiment, mouths 660*a*, 660*b* of the conduit 623, opening to an exterior of the ring 634 and to the interior surface 632 respectively, contact only sintered superhard material portions of the ring 634.

FIGS. 7*a*-*d* show various embodiments of rings 734*a*-*d* secured within conduits 723*a*-*d* by a variety of mechanisms. For example, ring 734*a*, shown in FIG. 7*a*, may be secured within conduit 723*a* by a ferrule 770*a*. This ferrule 770*a* may comprise a bushing or adapter inserted between the ring 734*a* and the conduit 723*a* in order to make a tight fit. Ring 734*b*, shown in FIG. 7*b*, may be secured within conduit 723*b* by a braze, adhesive, polyetheretherketone or other material 770*b* that may enter a gap between the ring 734*b* and conduit 723*a* as a liquid and then solidify into a solid to hold the ring 734*b* in place. Conduit 723*c*, shown in FIG. 7*c*, may comprise a shoulder 770*c* to limit translation of the ring 734*c* within the conduit 723*c*. Once the ring 734*c* is disposed within the conduit 723*c*, a sleeve 771*c* may be shrunk fit around an exterior surface of a body comprising the conduit 723*c* to secure the ring 734*c* against the shoulder 770*c*. Conduit 723*d*, shown in FIG. 7*d*, may comprise a taper 770*d*, that may mate with a similar taper on ring 734*d*, and a shrunk-fit sleeve 771*d* that preloads the ring 734*d* against the conduit 723*d*.

FIGS. 8*a*-*d* show various steps of one embodiment of a method of manufacturing a choke cage. First, as shown in FIG. 8*a*, grains of superhard material may be subjected to high-pressure, high-temperature conditions within a press 880. Under such conditions, at least some of the individual grains of the superhard material may sinter together to form a single mass 840, as shown in FIG. 8*b*. In the embodiment shown, the mass 840 of superhard material is also sintered to a substrate 842. However, other embodiments are also possible as discussed previously. The mass 840 of superhard material and substrate 842 may then be hollowed out to form a ring 834*b*. In the embodiment shown, this hollowing out is performed by a laser 881, however, other varieties of machining are also possible. Ring 834*c* may be secured within a conduit 823*c*, as shown in FIG. 8*c*, by any of the mechanisms described previously or others. Ring 834*d* may then be machined flush with a body 830 comprising conduit 823*d*, as shown in FIG. 8*d*. In the embodiment shown, this flush machining is performed by an electrical discharge wire 882, however, other varieties of machining are also possible.

Whereas certain embodiments have been described in particular relation to the drawings attached hereto, it should be understood that other and further modifications apart from those shown or suggested herein, may be made within the scope and spirit of the present disclosure.

The invention claimed is:

1. A choke cage, comprising:
   a body comprising an outer wall disposed circumferentially about a passage along a first axis to define an interior surface;
   a conduit passing from an exterior surface of the outer wall of the body to the interior surface along a second axis oriented crosswise to the first axis; and
   a ring secured within the conduit in the outer wall, wherein the ring comprises a sintered superhard material on a first end thereof adjacent the exterior surface of the outer wall of the body and a sintered superhard material on a second end thereof adjacent the interior surface of the outer wall of the body, and a substrate disposed between and attached to each of the sintered superhard materials.

2. The choke cage of claim 1, wherein the sintered superhard material forms a first circular band on the first end of the ring, the substrate forms a second circular band adjacent the first circular band, and the sintered superhard material forms a third circular band on the second end of the ring.

3. The choke cage of claim 1, wherein the ring defines a cylindrical, frustoconical or frustoparaboloidal internal shape.

4. The choke cage of claim 3, wherein the ring is secured within the conduit such that the internal shape widens from the exterior surface to the interior surface.

5. The choke cage of claim 1, wherein the ring is secured within the conduit such that a mouth on each end of the conduit contacts only the sintered superhard material.

6. The choke cage of claim 1, wherein the ring comprises a chamfer or round transitioning from an inner surface of the ring to an end thereof.

7. The choke cage of claim 1, wherein the ring is secured within the conduit by a ferrule.

8. The choke cage of claim 1, wherein the conduit comprises a translation-limiting shape.

9. The choke cage of claim 8, wherein the translation-limiting shape comprises a shoulder or taper.

10. The choke cage of claim 9, wherein the ring comprises an outer shape mating with the translation-limiting shape of the conduit.

11. The choke cage of claim 1, wherein the ring is secured within the conduit by a sleeve shrunk fit circumferentially around the exterior surface of the outer wall of the body, and a central axis of the sleeve extends along the first axis of the outer wall of the body.

12. The choke cage of claim 11, wherein the sleeve preloads the ring against the conduit in a direction along the second axis toward the first axis.

13. The choke cage of claim 1, wherein the ring is secured within the conduit by braze, adhesive, polyetheretherketone or friction.

14. The choke cage of claim 1, wherein the superhard material comprises polycrystalline diamond.

15. The choke cage of claim 1, comprising:
a plurality of conduits, including the conduit, disposed in the outer wall of the body, wherein the plurality of conduits is spaced circumferentially about the first axis; and
a plurality of rings, including the ring, each having the substrate disposed between and attached to each of the sintered superhard materials, where each of the plurality of rings is disposed in one of the plurality of conduits.

16. The choke cage of claim 1, wherein the ring comprises a bore through the sintered superhard material on the first end, the substrate between the first and second ends, and the sintered superhard material on the second end, wherein the bore and the passage define a fluid flow path through the body of the choke cage.

17. The choke cage of claim 16, comprising a plug disposed within the outer wall of the body, wherein the plug is configured to move along the first axis to open and close the bore in the ring.

18. The choke cage of claim 1, wherein the sintered superhard material on the first end of the ring has a first length along the second axis, the substrate of the ring has a second length along the second axis, and the sintered superhard material on the second end of the ring has a third length along the second axis, wherein the second length is greater than the first and third lengths.

\* \* \* \* \*